(12) United States Patent
Chen

(10) Patent No.: US 8,733,270 B2
(45) Date of Patent: May 27, 2014

(54) PRESSURE INDICATION DEVICE OF INFLATION MACHINE

(76) Inventor: Chi-Wen Chen, New Taipei (TW)

( * ) Notice: Subject to any disclaimer, the term of this patent is extended or adjusted under 35 U.S.C. 154(b) by 292 days.

(21) Appl. No.: 13/304,695

(22) Filed: Nov. 28, 2011

(65) Prior Publication Data

US 2013/0133565 A1    May 30, 2013

(51) Int. Cl.
*G01L 7/00* (2006.01)
*G01L 7/16* (2006.01)
*G01L 19/08* (2006.01)

(52) U.S. Cl.
USPC ............................................. 116/272; 417/63

(58) Field of Classification Search
CPC ............. G01L 7/00; G01L 7/02; G01L 7/022; G01L 7/024; G01L 7/016; G01L 7/0163; G01L 7/0166; G01L 19/08; G01L 19/10
USPC ............... 116/266, 272, 281, 283; 29/407.08; 73/744; 137/227, 557; 141/94, 95; 417/63, 234
See application file for complete search history.

(56) References Cited

U.S. PATENT DOCUMENTS

| | | | | |
|---|---|---|---|---|
| 318,152 A * | 5/1885 | Willard | ............................ | 73/744 |
| 1,275,180 A * | 8/1918 | Ellis | ............................... | 73/744 |
| 1,384,218 A * | 7/1921 | Stickel | ............................ | 417/63 |
| 1,425,614 A * | 8/1922 | Stickel | ............................ | 141/95 |
| 1,647,818 A * | 11/1927 | Semak | ........................... | 417/419 |
| 1,777,009 A * | 9/1930 | Matson | ........................... | 141/383 |
| 2,038,928 A * | 4/1936 | Farley et al. | ..................... | 73/744 |
| 3,438,351 A * | 4/1969 | Kirkwood | ...................... | 116/208 |
| 3,981,625 A * | 9/1976 | Wickenberg | ..................... | 417/63 |
| 4,198,921 A * | 4/1980 | Horton | ........................... | 116/283 |
| 4,779,457 A * | 10/1988 | Huang | ......................... | 73/146.8 |
| 4,884,175 A * | 11/1989 | Weng | ............................ | 362/119 |
| 5,104,295 A * | 4/1992 | Wong | ........................... | 417/44.6 |
| 6,095,762 A * | 8/2000 | Wheeler | ........................ | 417/275 |
| 6,485,276 B2 * | 11/2002 | Yang | ........................ | 417/423.14 |
| 2005/0265873 A1 * | 12/2005 | Chou | ............................ | 417/552 |

* cited by examiner

*Primary Examiner* — Richard A. Smith
(74) *Attorney, Agent, or Firm* — Leong C. Lei

(57) ABSTRACT

A pressure indication device is provided to connect to an inflation mechanism of an inflation machine. The pressure indication device includes a linearly movable plate and an elastic element. A scale bar having graduations is provided along a moving path of the plate. The elastic force of compression of the elastic element serves as a reaction force (restoration and returning force) for the linear movement of the plate. Correspondingly, a pressure is induced in an air compartment of the inflation mechanism the so that the moving distance of the plate is indicative of the pressure level and thus precise measurement of pressure can be realized.

6 Claims, 4 Drawing Sheets

PRESSURE INDICATION DEVICE OF INFLATION MACHINE

(a) TECHNICAL FIELD OF THE INVENTION

The present invention generally relates to a pressure indication device of inflation machine, and more particularly to an inflation machine that comprises an inflation mechanism having an air compartment that is provided with at least two outlet openings respectively coupled to first and second conveyance tubes, of which the first conveyance tube is connected to the pressure indication device and the second conveyance tube supplies air to an object to be inflated, and the pressure indication device comprises an elastic element of which an elastic force of compression is used to serve as a reaction force (restoration returning force) for linear movement of a plate and correspondingly, a pressure induced in the air compartment drives the plate to make a linear movement of which the distance of movement is indicative of the level of pressure so that precise measurement of the air pressure inside the air compartment of the inflation mechanism can be realized.

(b) DESCRIPTION OF THE PRIOR ART

Various machines or devices that are available in the market are often provided with a mechanical pressure gauge, which functions to measure and display a pressure level. Further, in measuring gas pressure to inspect the internal pressure level of a conveyance conduit or a storage device, a mechanical pressure gauge is also used.

Most of the conventional mechanical pressure gauges are manufactured according the principle of Bourdon tube. A Bourdon tube based pressure gauge applies the principle that the Bourdon tube will undergo deformation of expansion when pressurized, so as to cause rotation of an indication hand. Further, the structure of the conventional Bourdon tube type mechanical pressure gauge is composed of components including an air inlet seat, a plurality of gear trains, a pull bar, a return spring, an indicator axle. An end of the Bourdon tube is connected to the pull bar and an opposite ends connected to the air inlet seat. When air flows through the air inlet seat into the Bourdon tube, the Bourdon tube is pressurized and expands to move the pull bar and the pull bar acts on the gear trains to drive the indicator axle for rotating an indicator hand. On the other hand, when the pressure diminishes, the Bourdon tube restores its original shape and the indicator axle is acted upon by the returning spring to have the indicator hand return to reset position, so that the capability of pressure measurement of the pressure gauge is realized.

However, in the conventional Bourdon tube type mechanical pressure gauge, since the components such as the Bourdon tube, the gear trains, the returning spring are precise and fragile components. The more the precise components are, the higher the cost is. Further, the Bourdon tube and the returning spring are easily affected by external temperature (cold or hot) and humidity and the original expansion coefficient or spring characteristics may be changed so that the preciseness of measurement is deteriorated. Further, transmission can only be achieved when precise mating engagement is established among the gear trains. High machining precision of the mating gear teeth leads to high costs. Further, when the pressure gauge is dropped or hit inadvertently, errors or gaps may be formed between mating gear teeth, leading to undesired instability of deviation or positional shifting or jerking of the indicator hand when pressure varies. These are common problems to the conventional Bourdon tube type mechanical pressure gauges.

Further, in respect of manufacturing, due to the high precision of component and assembling, it is easy to increase the number of disqualified product and the assembling operation may get slow and complicated and require durability and impact test. All these affect the manufacturing cost and the quantity of acceptable products. This is also a problem to be overcome for the conventional pressure gauges.

SUMMARY OF THE INVENTION

In view of the above problems, the primary objective of the present invention is to provide a pressure indication device of inflation machine. The pressure indication device comprises a linearly movable plate and an elastic element. A scale bar having graduations is provided along a moving path of the plate. The elastic force of compression of the elastic element serves as a reaction force (restoration and returning force) for the linear movement of the plate. Correspondingly, a pressure is induced in an air compartment of the inflation mechanism the so that the moving distance of the plate is indicative of the pressure level and thus precise measurement of pressure can be realized. Consequently, there is no need to adopt the conventional pressure gauge that is expensive.

Another objective of the present invention is to provide a pressure indication device of inflation machine. The pressure indication device is connected to an inflation mechanism of an inflation machine. The inflation mechanism comprises an air compartment formed on a piston cylinder. The air compartment is provided with at least two outlet openings that are respectively coupled to a first conveyance tube and a second conveyance tube, wherein the first conveyance tube is connected to the pressure indication device and the second conveyance tube is provided for supplying air to an object to be inflated. The first conveyance tube transmits air pressure to the pressure indication device so that the distance of linear movement of the plate driven by the air pressure is indicative of the pressure level and thus precise measurement of the internal pressure of the air compartment of the inflation mechanism the can be realized.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 3, 4, and 5, the present invention discloses a pressure indication device of inflation machine. The pressure indication device 1 is mounted to an inflation machine 6.

Figure 1:
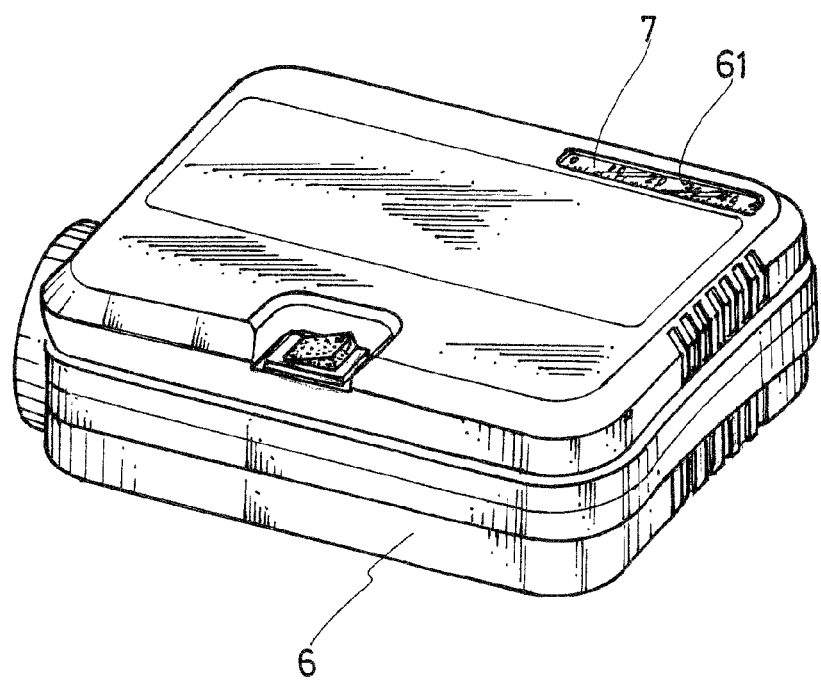
FIG. 1 is a perspective view showing an inflation machine according to an embodiment of the present invention.
Figures 2, 3:
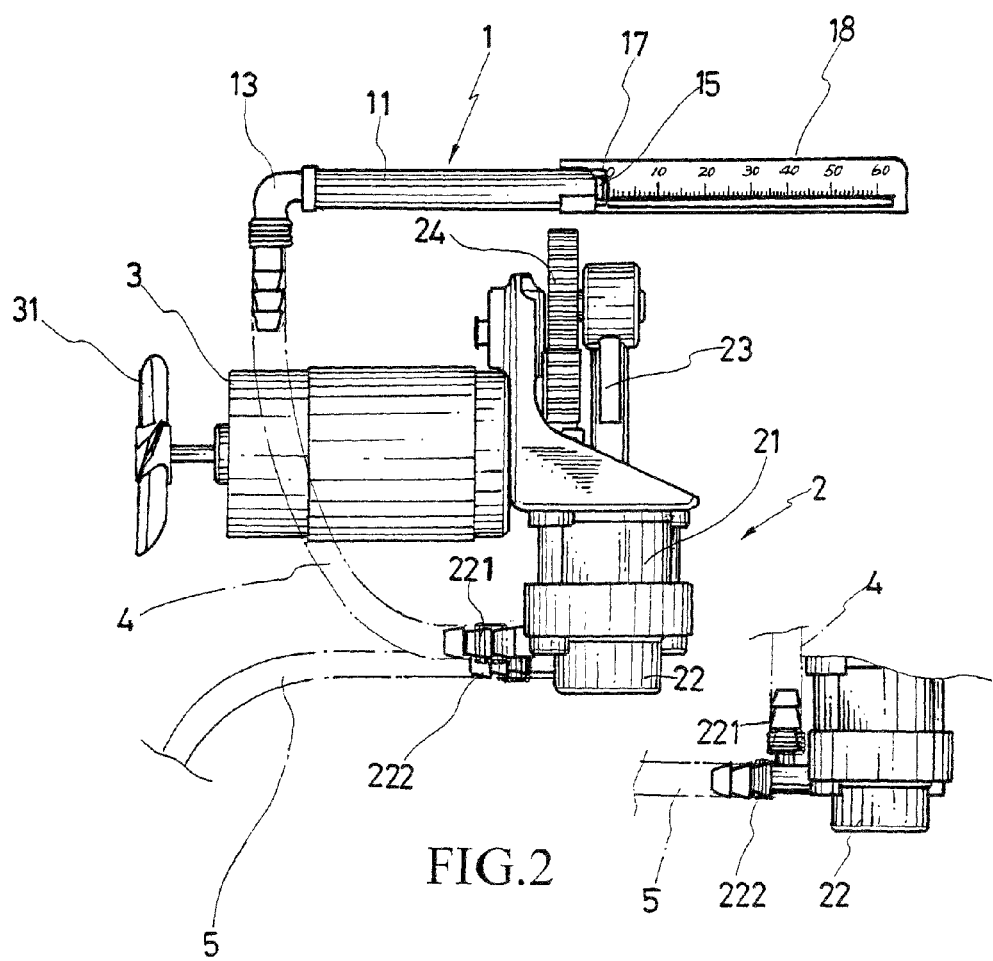
FIG. 2 is a schematic view showing a pressure indication device according to an embodiment of the present invention.
FIG. 3 is a schematic view showing an inflation mechanism of the inflation machine according to another embodiment of the present invention.
Figure 4:
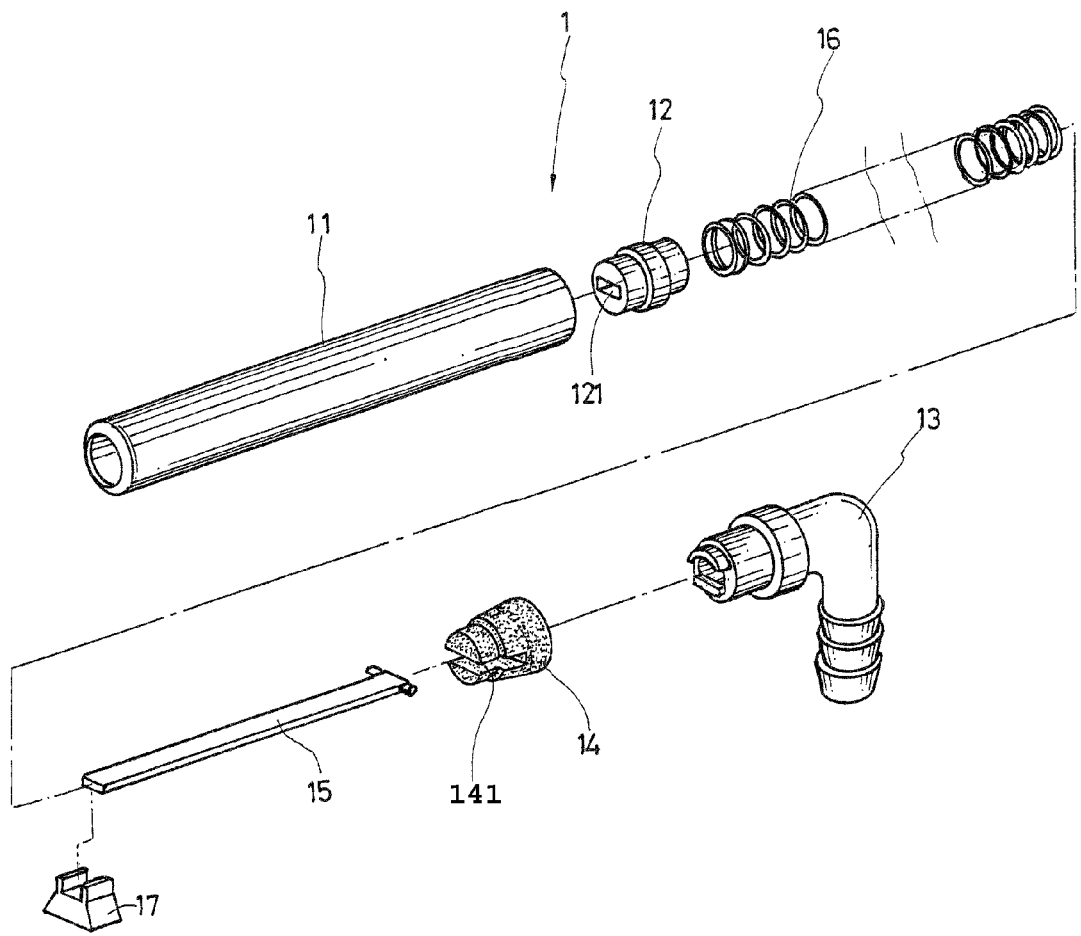
FIG. 4 is an exploded view of the pressure indication device of the present invention.
Figure 5:
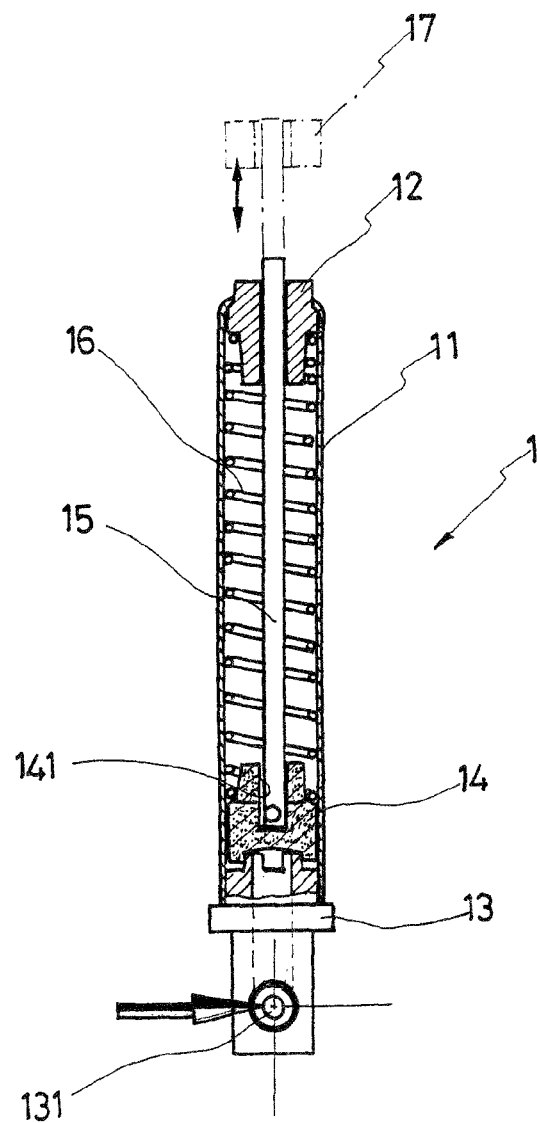
FIG. 5 is a cross-sectional view, in an assembled form, illustrating an operation of the pressure indication device of the present invention.

The pressure indication device 1 comprises a hollow tubular body 11. The hollow tubular body 11 has two ends that are respectively provided with a protection cover 12 and an inlet joint 13. The protection cover 12 forms a through hole 121. The inlet joint 13 forms an inlet opening 131 extending outside the hollow tubular body 11. The hollow tubular body 11 receives therein a push block 14 between the protection cover 12 and the inlet joint 13. The push block 14 has an outer circumference that provides an excellent function of air tightness. The push block 14 is connected to a strip-like plate 15, and the plate 15 has an end extending beyond and exposed outside the through hole 121 of the protection cover 12. Further, the hollow tubular body 11 receives therein an elastic element 16 between the protection cover 12 and the push block 14. The elastic element 16 can be for example a spring encompassing outside the plate 15. Further, the portion of the plate 15 that is exposed outside the through hole 121 of the protection cover 12 is provided with an indicating piece 17. Arranged outside the hollow tubular body 11 is a scale bar 18 corresponding to a moving path of the plate 15 and the scale bar 18 forms graduations, as shown in FIG. 2.

With such an arrangement, air pressure gets, through the inlet opening 131 of the inlet joint 13, into the interior space of the hollow tubular body 11. The pressure causes a displacement of the push block 14 and the plate 15 and at the same time compresses the elastic element 16, eventually realizing linear movement of the push block 14, the plate 15, and the elastic element 16 within the hollow tubular body 11. On the other hand, when air pressure diminishes, the push block 14 is acted upon by a restoration force of the elastic element 16 to have the push block 14 and the plate 15 returning to home position and reset. As such, the pressure indication device 1 uses the elasticity caused by compression of the elastic element 16 to serve as a force for driving linear movement of the push block 14 and the plate 15, so that when air pressure drives the push block 14 and the plate 15 to do linear movement, observation of the moving distance of the plate 15 with respect to the scale bar 18 may indicate the air pressure level and realizing precise measurement of the air pressure.

However, when the plate 15 is moved along the scale bar 18, the indicating piece 17 provides a clear indication of the relative position of the plate 15 with respect to the graduations of the scale bar 18.

The push block 14 and the plate 15 can be arranged as a combined component, or alternatively, the push block 14 and the plate 15 are arranged as two independent components. An example will be given for the present invention, in which the push block 14 forms a fixing slot 141 so that the plate 15 may be fixed in the fixing slot 141 of the push block 14 to allow the plate 15 to move in synchronization with the push block 14.

Further, the pressure indication device 1 of the present invention can be mounted in an inflation machine 6. The inflation machine 6 comprises: an inflation mechanism 2 and a driving device 3. The pressure indication device 1 is connected to the inflation mechanism 2 of the inflation machine 6. The inflation mechanism 2 comprises a cylinder 21. An air compartment 22 is formed at an end of the cylinder 21 and the air compartment 22 is provide with at least two outlet openings 221, 222, which are respectively connected to a first conveyance tube 4 and a second conveyance tube 5. A piston rod 23 is arranged at an opposite end of the cylinder 21 and the piston rod 23 is connected to a gear train 24. An end of the driving device 3 is coupled to the gear train 24 of the inflation device 2 and an opposite end carries fan blades 31.

The driving device 3 drives the gear train 24 to rotate and the gear train 24 causes the piston rod 23 to move as to have an airflow generated by the inflation device 2 to flow through the outlet openings 221, 222 of the air compartment 22 to get into the first conveyance tube 4 and the second conveyance tube 5. The first conveyance tube 4 is connected to the inlet joint 13 of the pressure indication device 1. The second conveyance tube 5 may be extended to supply air to an object to be inflated (such as a tire, which is not shown), whereby the air pressure generated by the inflation mechanism 2 or a back pressure (pressure detection) caused by an external pressure source can flow through the air compartment 22 and the first conveyance tube 4 to the pressure indication device 1. Through the relative displacement of the plate 15 of the pressure indication device 1 with respect to the scale bar 18, the gas pressure level can be precisely measured.

Next, the outlet openings 221, 222 of the air compartment 22 of the inflation mechanism 2 can be independent channels (as sown in FIG. 2) or the outlet openings 221, 222 are of a bifurcate arrangement having a common channel (as shown in FIG. 3), both being equivalent structure.

Further, the inflation machine 6 forms an observation window 61 in a casing thereof and the observation window 61 corresponds to the scale bar 18 of the pressure indication device 1, so that a user may observe the pressure level through the observation window 61. Further, the observation window 61 may be provided with a cover 7. Further, the present invention may selectively provide lighting elements (not shown) around the scale bar 18 of the pressure indication device 1 to form backlighting for the scale bar 18, whereby a user may use it in a nighttime or in a dark environment.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An inflation machine comprising a casing, an inflation mechanism, which is received in the casing and is coupled to and driven by a driving device, and a pressure indication device, which is mounted inside the casing, wherein the casing comprises an observation window, wherein the inflation mechanism comprises an air compartment, the air compartment being provided with at least two outlet openings, which are respectively connected to a first conveyance tube and a second conveyance tube, the first conveyance tube being connected to the pressure indication device, the second conveyance tube being adapted to connect to an object to be inflated, wherein the pressure indication device comprises a hollow tubular body, the hollow tubular body having two ends that are respectively provided with a protection cover and an inlet joint, the protection cover forming a through hole, the inlet joint forming an inlet opening extending outside the hollow tubular body and connected to the first conveyance tube, the hollow tubular body receiving therein a push block between the protection cover and the inlet joint, the push block being connected to a strip-like plate, which has an end extending beyond and exposed outside the through hole of the protection cover, the hollow tubular body receiving therein an elastic element between the protection cover and the push block, the push block and the strip-like plate being movable together along a moving path, and wherein a stationary scale bar is mounted inside the casing at a location outside the pressure indication device and corresponding to the observation window, the scale bar being distant from the inflation mechanism.

2. The inflation machine according to claim 1, wherein the elastic element comprises a spring encompassing outside the plate.

3. The inflation machine according to claim 1, wherein the end of the plate exposed outside the through hole of the protection cover is provided with an indicating piece.

4. The inflation machine according to claim 1, wherein the scale bar forms graduations, a lighting element being provided around the scale bar.

5. The inflation machine according to claim 1, wherein the two outlet openings of the air compartment are independent channels.

6. The inflation machine according to claim 1, wherein the two outlet openings of the air compartment are of a bifurcate arrangement having a common channel.

* * * * *